April 12, 1966     F. C. WEBER, JR     3,245,827
POLYURETHANE COATED SUBSTRATE AND METHOD OF COATING
Filed Jan. 2, 1964
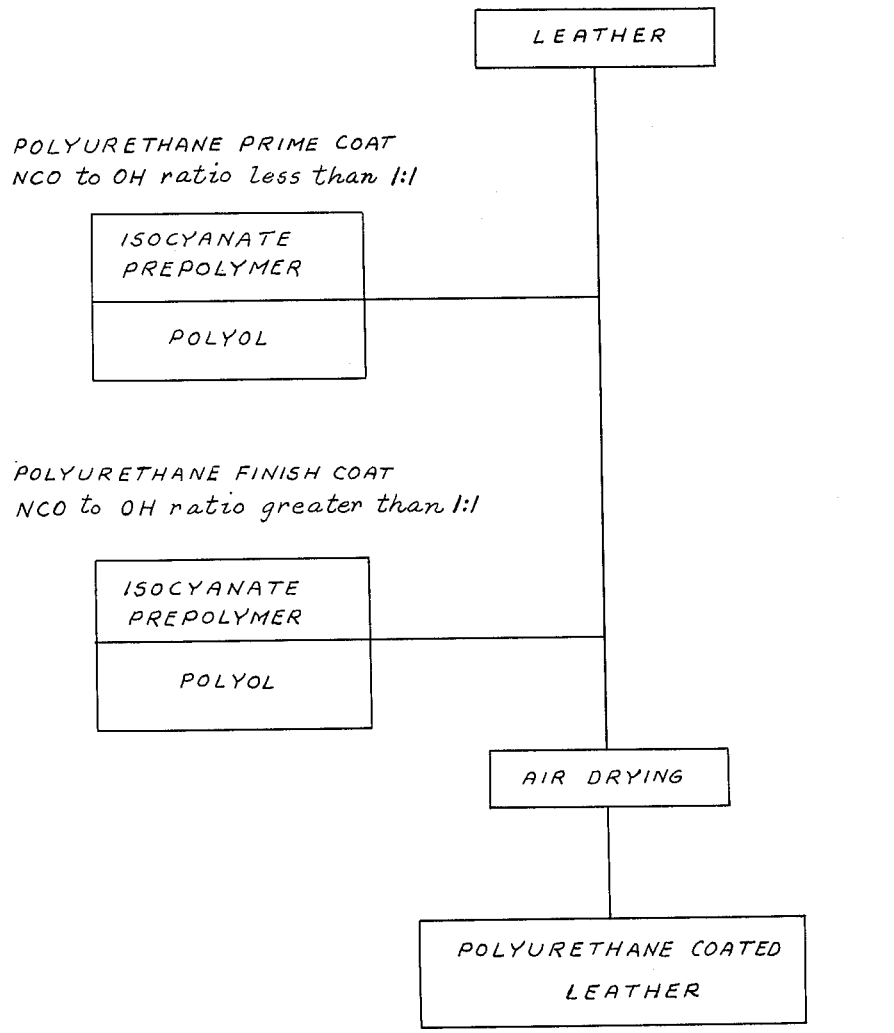
INVENTOR:
FRED C. WEBER JR.
BY Kingsland, Rogers, Ezell, Eilers & Robbins
ATTORNEYS United States Patent Office 3,245,827
Patented Apr. 12, 1966

3,245,827
POLYURETHANE COATED SUBSTRATE AND
METHOD OF COATING
Fred C. Weber, Jr., Clayton, Mo., assignor to Phelan-
Faust Paint Manufacturing Company, St. Louis, Mo.,
a corporation of Missouri
Filed Jan. 2, 1964, Ser. No. 335,382
17 Claims. (Cl. 117—76)

This application is a continuation-in-part of my copending application Ser. No. 46,343, filed Aug. 1, 1960, for Polyurethane Coating for Leather, now abandoned.

This invention relates to improvements in leather and other substrate coatings, and, in particular, to a polyurethane coating of a special formulation.

In the past leather finishes have been of two classifications, water soluble finishes and organic solvent finishes. The water soluble finishes have generally provided leather coatings of suitable flexing characteristics, but have been objectionable because of lack of water resistance. On the other hand, the organic solvent finishes, although being usually of a high degree of water resistance, have had relatively poor adhesion, poor flexibility, or undesirable tack.

Efforts have been made to improve the organic solvent finishes by employing an organic polyisocyanate composition, as in the Loshaek Patent No. 2,884,340, granted Apr. 28, 1959. However, the lack of control using the composition and process of this patent makes it difficult to provide a truly satisfactory coating in actual production due to reaction of the polyisocyanates with the leather chemicals, such as lipids, amides, and amines, among others, which are undesirable and may cause stiffening of the leather. As a special feature of the instant invention, such reaction may be avoided by using a multi-finish coating in which the ratio of isocyanate to OH bearing reactants is such that insufficient isocyanate is provided to react with the leather chemicals in the prime coat and wherein the ratio is increased in the top coat to provide an excess of isocyanate to effect intercoat reaction and facilitate intercoat adhesion.

Although the invention is herein described with respect to leather, other substrates such as cellulosic material, wool, nylon, glass fiber and the like may be employed. Such substrates have reactive groups that tend to react with the isocyanate as do the leather chemicals. Thus, cellulosic materials have OH groups, nylon has a polyamide group, and glass fiber has adsorbed moisture all of which may be reactive. Thus, although this invention is described with repsect to leather, it will be understood that other substrates may be employed wherever reactivity of the substrate with the isocyanate is a problem.

By means of the instant invention there has been provided a polyurethane coating that is easy to apply, has a high degree of water resistance, and provides a hard and durable coating that has exceedingly high flexibility. The coating is similar to the so-called patent leathers and in actual flex tests has been satisfactorily subjected to over one million flexing operations without failure, whereas the best of other conventional coatings, including polyurethane coatings, have failed at as low as 120,000 flexings.

The improved polyurethane coating of this invention employs an isocyanate reacted with polyols of a particular type, i.e., polyesters or polyethers having a particular number of hydroxyl groups and a specified functionality and molecular weight range.

The accompanying drawing is a flow sheet illustrating the method.

The polyols employed are linear polyols and branched polyols. The linear polyol employed has a preferable molecular weight range of 2500 to 3000, although it may be as low as 2000 or as high as 5000, and a functionality of about 2, which may be as high as 2.5. The branch chain polyol has a preferable molecular weight of 500 to 900 and a functionality of about 2.5 to 3.5, however, the molecular weight may be considerably lower where alkanolamines are employed and may be as high as 1500 and the functionality may be as high as 4.0. It is another particular feature of this invention that the linear polyol and the branch polyol above described may be used in combination and, particularly where polyesters are employed, the ratio of the branch chain polyol to the linear polyol can vary from 0 to 6 parts to 1 part of the linear polyol on an equivalence basis. If the branch polyol is used in an amount above 6 parts, it has been found that cracking of the coating may occur as there is not enough of the linear polyol. On the other hand, no branch chain polyol need be employed in a particular embodiment of this invention where special proportioning of the components is followed. However, where a slight tack on an equivalence basis occurs it is desirable to use at least some branch polyol, and, as an example, as low as onequarter part of the branch polyol to one part of the linear polyol can be employed. At these low proportions, or with the use of the linear polyol alone, it has also been found that there is slightly less tack with the use of an amine catalyst.

It is also a special feature of this invention to control the reaction of the polyol with the isocyanate in the prepolymer before the application to leather for the formation of the coating thereon. This is done by preparing a prepolymer mix of the isocyanate and a separate polyol. In the preparation of this prepolymer mix at least about 10% excess of isocyanate to the polyol is employed, and this excess may be as high as 100% as an example.

In determining the proportions of the branch polyol to the linear polyol, it should also be noted that at the lower ratio of the branch polyol, the abrasion resistance is generally poor. Likewise, there is poor chemical resistance in the coating where steam and solvents are encountered. On the other hand, at the higher ratio of the branch polyol to the linear polyol, as in the ratio of 6:1 to prevent cracking, the branch polyol should be only slightly branched and of relatively low functionality.

It is also a feature of this invention that in the application of the coating the isocyanate is added as a prepolymer preferably as a reaction product of a diisocyanate with a di- or tri-functional polyol. The prepolymer may have a molecular weight range of about 600 to 3500. The tri-functional polyol is in the form of the branched polyol, having a molecular weight range of 135 to 900. The difunctional polyol is preferably in linear form, although some branching may improve solubility, and has a molecular weight range of 500 to 3000 with the hydroxyl group as near to the end of the chain as possible.

Among the polyols employed have been polyethers such as hydroxyl containing ethylene and propylene glycols, as well as tri-functional polyols made from ethylene oxide or propylene oxide adducts of tri-functional polyols or castor oil derivatives. Other polyols are conventionally made by reaction of the glycols above mentioned with adipic acid or maleic anhydride to provide polyesters that are hydroxyl terminated. The production of such polyols in the form of polyesters is well known in the art as shown in the Carleton Ellis Patent No. 2,255,313, granted Sept. 9, 1941. The polyethers employed are also conventional and have the same chain characteristics and molecular weight and functionality characteristics in general as the polyesters. These polyethers may be conventional stock polyethers conventionally obtained from such manufacturers as Dow Chemical Company, Union Carbide Company, and Wyandotte Chemical Company.

It has also been found that the isocyanate reaction can be promoted with polysulfides, polyamides, or polyamines, and mercaptans which are basically of a paraffin-type with an SH group at each end. Thus, as an example, amines that have been employed have been mono-, di-, and tri-functional amines, such as dimethyl ethanol amine, methyl diethanolamine, and tri-isopropanolamine.

In the use of the coating composition, as recited previously, the isocyanate is preferably made up as a prepolymer. The remaining proportion of the composition employing the linear polyester is desirably prepared with conventional lacquer-types of solvent. Thus, as an example, aromatic solvents, ketones, and esters, such as xylene, toluene, methyl ethyl ketone, methyl isobutyl ketone, ethyl acetate, butyl acetate, phenyl acetate, and methyl Cellosolve acetate can be employed. The aromatics are used because of their low cost, while the ketones are a true solvent for the polyols and the isocyanate and have a limited boiling point range. The methyl Cellosolve acetate has a somewhat higher boiling point range. The solvent amount employed is non-critical and can be in the general range of 25-75% of the composition. In addition, ethyl acetate can be employed as a carrier for the pre-polymer composition and the solvency properties of the ethyl acetate can be used to vary viscosity.

Additionally, it has been found preferable to use a cellulose acetate butyrate with the linear polyester. This agent is a solid, but is used as a 10% toluene solution, as an example, for ease in handling. The toluene solution is not critical and other solvents can be used where they are of proper compatibility. The employment of the cellulose acetate butyrate solution is made as a flow control to eliminate crawling or cratering of the composition and to control viscosity. In addition, a silicone and other additives can be similarly employed. These components are used since the linear polyester is liquid and control of the fluidity and viscosity is desired for proper application and penetration control. In some instances, it may be further noted that a nonionic oil or solvent miscible wetting agent can be used in the formulation for modification of the surface tension and to wet the leather and eliminate crawl and formation of craters and pin holes.

The basic reaction for the formation of the polyurethane is the reaction of an isocyanate with the hydroxyl group of a polyester or polyether. This basic reaction is as shown below where R' indicates a polyester or polyether and RNCO is an isocyanate:

$$RNCO + R'OH \longrightarrow R'O\underset{H}{\overset{O}{\underset{\|}{R{-}N{-}C{-}O{-}R'}}}$$

The particular isocyanate employed is preferably a di-functional isocyanate, although a tri-functional isocyanate can be employed with somewhat less desirability and somewhat less flexibility. As an example, the diisocyanate may preferably be tolyl diisocyante, and, in the prepolymer formulation, the tri-functional polyol is preferably trimethylol propane. It is particularly to be noted that although the tolyl diisocyanate is toxic, per se, when it is preliminarily reacted with the trimethylol propane, the toxicity is removed by the reaction.

The prepolymer is conventionally prepared by the reaction of toluene diisocyanate with trimethylol propane at an NCO/OH ratio of 2:1 as indicated below:

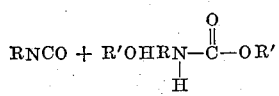

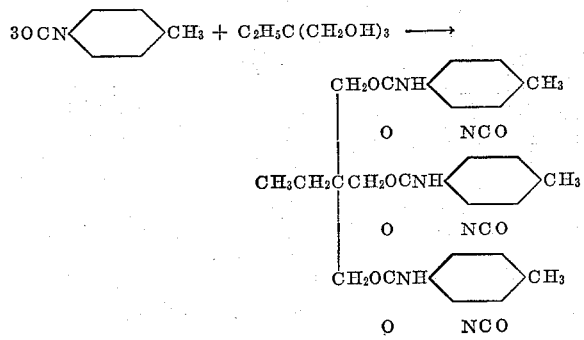

It is noted that in the above reaction the trimethylol propane, used as a polyol in the prepolymer formation, is all used up so to speak to react with three of the NCO groups in the original isocyanate in the formation of the prepolymer, which prepolymer has additional NCO groups available for further reaction with additional polyol of a different type as a polyester or polyether which is subsequently added at the time of formation of the prime coat or the finish coat as the case may be.

In this invention a very durable flexible and hard coating can be achieved by a multiple application. This coating may be applied upon conventional leather commonly used in the shoe industry by various methods of application, the most practical and successful being by spraying. In the application, conventional pigments and soluble dyes can likewise be advantageously incorporated without any difficulty. The leather employed may be degreased full-grain leather for best appearance, but buffed and nondegreased leather may also be employed. Split leather may also be employed.

To illustrate this invention, there will be described below several examples showing various formulations that can be employed. In the first of these examples, it will be noted that in the prime coat, which is first laid down upon the leather, an excess of polyol is employed over the isocyanate, while in the finish coat an excess of isocyanate is employed over the polyol. The excess of polyol in the prime coat avoids the possibility of reaction of the isocyanate with the leather chemicals. The leather that is obtained from conventional sources varies, as is well known in the art, in pH from 4½ to 6. The possibility of reaction of the isocyanate with lipids, amides, amines, and other chemicals, can, accordingly, be obviated by the proportioning employed in this invention. Thus, the very reactive isocyanate, by the use of an excess of polyol, is made unavailable to react with the leather chemicals and is not required for bonding with the polyol employed in a finished coat.

By the formulation first described, applicant has made possible the bonding of a prime coat directly to a finished coat. The isocyanate is employed in both coats. No special preliminary leather conditioning coating or intermediate coat is required to provide for adhesion to the leather or between the prime and finished coats.

EXAMPLE 1

In this example a prime coat and a finish coat are employed. In the prime coat, as well as in the finish coat, the isocyanate prepolymer is prepared separately from the polyol solvent blend by interreacting an isocyanate like toluene diisocyanate with a polyol like trimethylol propane. In the formulation, the polyol blend, which is pigmented, is identified as a polyol catalyst or resin phase, and the isocyanate prepolymer is identified as the prepolymer phase.

*Primer coat*

| Polyol catalyst phase: | Percent by weight |
|---|---|
| Long chain linear polyester functionality 2.0 molecular weight 2620 (range 28-51%) | 35 |
| Barium sulfate (range 0-50%) | 33 |
| Carbon black (range 0-8%) | 1.6 |
| Non-ionic oil or solvent miscible wetting agent (range 0.1-1.0%) | 0.6 |
| Methyl ethyl ketone—solvent for system | 20.5 |
| Toluol—diluent and partial solvent or extender | 9.3 |
| | 100.0 |

| Prepolymer phase: | |
|---|---|
| Trifunctional isocyanate prepolymer (mol. wt. 970, functionality 3.0) | 45.0 |
| Ethyl acetate as a solvent | 15.0 |
| Methyl isobutyl ketone as solvent | 40.0 |
| | 100.0 |

In the polyol catalyst phase the non-ionic oil or solvent miscible wetting agent acts to wet the leather and change the surface tension to eliminate crawl and prevent the formation of craters or pin holes in the leather. The wetting agent may be polyethylene glycol 400 monolaurate, soya lecithin, or the commercial embodiment of non-ionic tritons. The solvents in the polyol catalyst phase are not critical and can be adjusted as desired. The methylethyl ketone is a solvent for the system and is more volatile than the toluol and is desired for better penetration control. However, it should not be used exclusively as a solvent since too much of the methylethyl ketone in the system will cause soaking into the leather to an undesired degree. The toluol is a desirable diluent and partial solvent for the system and is used in the nature of an extender. In the blending of the polyol catalyst phase and prepolymer phase, four parts of polyol catalyst phase is used to one part of prepolymer phase by volume in the prime coat. This corresponds to 83 parts of polyol catalyst phase to 17 parts prepolymer phase by weight. However, in practice, volumetric blending is desired as it is more convenient for plant handling than weighing.

*Finish coat*

Polyol catalyst phase: Percent by weight
Long chain linear polyester (functionality 2.0,
  molecular weight 2620) _____ 77.5
Oil soluble aniline dye (any oil soluble dye)
  (range 0–2.0%) _____ 0.6
20% solution cellulose acetate butyrate in toluene (range 0.5–5.5%) _____ 2.3
Methyl isobutyl ketone as solvent _____ 19.6
                                           ─────
                                           100.0

Prepolymer phase:
Trifunctional isocyanate prepolymer (mol. wt.
  970, functionality 3.0) _____ 45.0
Ethyl acetate as solvent _____ 15.0
Methyl isobutyl ketone as solvent _____ 40
                                           ─────
                                           100.0

In the finish coat it will be noted that the polyester employed in the polyol catalyst phase can be identical with the polyester employed in the prepolymer phase of the prime coat. The oil soluble aniline dye can be of any proper type as the formulation is not critical. The cellulose acetate butyrate has been found to be very important in this formulation. It is difficult to find a component that is compatible with the system, but cellulose acetate butyrate has worked extremely well. In the cellulose acetate butyrate the free hydroxy groups on the compound react with the isocyanate and provides a full control in viscosity to a desired degree to keep down the penetration. In further formulations listed below, it was formerly the practice to employ an intermediate swab coat between the prime coat and the finished coat, but, by virtue of the instant formulation, this can very desirably be obviated with savings of labor and expense by the use of the cellulose acetate butyrate in the polyol catalyst phase of the finish coat, as this component keeps the finish coat from soaking in undesirably.

It will be noted in the finish coat that the prepolymer phase is identical in formulation to the prepolymer phase of the prime coat. This makes the blending in manufacture quite convenient. In the blending of the polyol catalyst phase and the prepolymer phase of the finish coat, the two can be added together in equal quantities by volume. By weight this corresponds to 52.6 parts of the polyol catalyst phase and 47.4 parts of the prepolymer phase.

In the above formulation, the prime coat has a desirable NCO to OH ratio of 0.98 for best results. This, however, may be varied to as low as 0.5, but at this lower limit the prime coat is somewhat tacky and difficult to handle. This may be compensated for to some extent by employing a relatively greater NCO to OH ratio in the finish coat. The ratio may also be increased to 1.25, but at this higher value there is inferior intercoat adhesion because of some possible reaction of the isocyanate with the leather chemicals and moisture in the air. In the finish coat the NCO to OH ratio is preferably 2.1. For the excess NCO, excess polyol in the prime coat and moisture from the air will complete the curing of the isocyanate in the finished coat. The NCO to OH ratio in the finish coat, however, may be as low as 1.1, but at this low ratio and with the particular polyester employed there is a tackiness present unless a higher functionality polyester is employed, such as a trifunctional polyester, to increase cross linking. However, this should be balanced because flexibility will be decreased. The ratio may also be as high as 2.5, but at this higher ratio the coat will tend to be too inflexible because of higher cross linkage. However, where the basic leather is too stretchy and pull up is high, the high ratio of NCO to OH of 2.5 to 1 and even higher may be utilized to make the leather less stretchy and more uniform. Thus, as an example, the NCO to OH ratio in such cases may be as high as 3.7 to 1.

In the prime coat, as previously mentioned, the NCO moiety in the diisocyanate prepolymer to the OH moiety in the polyol should be about .5 up to about 0.99 or slightly less than 1 to 1 to prevent reaction of the NCO moiety with the leather chemicals with adverse results. The major portions and predominant portion of the OH moiety is from the polyol and in most cases the NCO to OH ratio can be designed by reference to the polyol component. In some cases, however, in the polyol phase, solvents such as methyl isobutyl ketone, and other solvents employed, may be of varying purity, and there may be a substantial proportion of alcohol and water both supplying an OH moiety. In such cases where the OH component is increased by addition of components other than the polyol, the general overall NCO to OH ratio is depressed. It is a feature of this invention that the NCO to OH ratio is calculated on the basis of the entire system, and in such cases where an appreciable OH moiety may be present from other sources as well as the polyester, the OH effect of the solvents, and any other OH bearing components, should be calculated into the system. This can be done very simply by figuring the OH number of the solvent by conventional means, as most commercial solvents have a known OH number. In such instances the NCO to OH ratio based on the NCO moiety in the isocyanate prepolymer to the OH moiety in the polyol only may be slightly greater than 1, since there is additional OH in the solvent system which will bring the NCO to OH ratio in the complete system to a slightly less than a 1 to 1 ratio in accordance with the aforementioned discussion. The examples that follow are primarily based on an NCO to OH ratio calculation considering the OH and the polyol only, as the effect of the OH in the other solvents and other components employed is somewhat minimal. However, in Example 7 the OH ratio in the solvents is appreciable and is taken into consideration showing the effect of a substantial amount of OH components in such solvent systems.

In the application of the formulation, the polyol catalyst phase is added to the prepolymer phase in the prime coat, together with mixing, shortly before application to the leather. The period of time for use after mixing may be up to about 24 hours or so, but beyond that time setting may take place and longer periods should be avoided. The application of the prime coat may be made directly to leather to insure a good wet coat and complete covering of the leather. After the application of the prime coat and after drying, which may take place in about 12 to 16 hours at 80° F., or 6 to 8 hours at 180° F., the finish coat may be added to the prime coat. The finish coat may be mixed together in the same fashion as the prime coat as described above. The finish coat is then applied on top of the prime coat to insure complete coverage and wetting. The leather is then permitted to dry in air for a sufficient time to insure curing of the isocyanate. Where desired, for top quality, an additional finish coat can also be employed by a second application.

In the above formulation of Example 1, the prime coat is pigmented and dye may be employed in the finish coat. This provides a high degree of uniformity and hold-out on nonuniform leather. Thus, it is possible to use leather of comparatively poor grade and obtain very desirable coating results. The pigment makes it possible to make the appearance of the leather more uniform. It will be noted that carbon black may be employed as the sole pigment where desired, and, if so used, the quantity should be as much as three to ten percent of the dry film. At higher percentages there is a tendency to crack and at lower percentages there is a tendency not to fill all of the leather pores. Other pigments besides barium sulfate can be employed in the prime coat. Where high bulk value pigments like barium sulfate are employed, a rather high weight percent is utilized as shown in the example. This can be 20 to 50% of the total non volatiles in the coating, but lesser amounts can be employed for pigments of lower bulking values than the barium sulfate. Use of pigments other than carbon black make it possible to produce any desired color on the finished leather.

There are listed below several alternative formulations for the employment of polyester as the polyol in the primer formulation to illustrate the breadth of the invention.

EXAMPLE 2

| Polyol catalyst phase: | Percent by weight |
|---|---|
| Barium sulphate | 33.9 |
| Carbon black | 1.9 |
| Polyester (mol. wt. 1080, functionality 3.2) | 21.5 |
| Polyester (mol. wt. 2060, functionality 2.0) | 14.3 |
| Methyl ethyl ketone | 19.8 |
| Toluol | 8.6 |
| | 100.0 |

| Prepolymer phase: | Percent by weight |
|---|---|
| Isocyanate prepolymer (mol wt. 970, functionality 3.0) | 45.0 |
| Ethyl acetate | 15.0 |
| Methyl isobutyl ketone | 40.0 |
| | 100.0 |

In Example 2 polyol catalyst phase and prepolymer phase are combined in the volumetric ratio of 4 parts of polyol catalyst phase to 1 part of prepolymer phase. In this formulation the NSO to OH ratio is 0.47.

In Examples 1 and 2 above, the linear polyester may be employed in the general molecular weight range of 900 to 3000. However, at the lower range the formulation may tend to be too tacky, while at the higher range it may be too insoluble. This may be compensated to some extent by making the lower range molecular weight polyester of a higher degree of branching and slightly increasing the functionality, while at the higher range the polyester should be linear and of relatively low functionality. In the above examples also, silica gel may be employed in the finish coat in a range up to 10% by weight on the dry film basis. This silica gel is preferably employed in the so-called solvent or catalyst phase, i.e., the component that does not contain the isocyanate prepolymer. The lower percentages of silica gel will provide a full gloss while at the high range the appearance will be dead flat. It has been found that 5% of silica gel is preferable and will provide a very high degree of toughness, scuff, and abrasion resistance, as well as a low luster finish, which is highly desired in men's shoes.

It has also been found that polyethers, as mentioned previously, may be used as the polyol. Thus, a polyether isocyanate prepolymer can be desirably employed. The polyethers may be cross linked with hydroxyl bearing amine reactants, although other hydroxyl bearing agents may be employed. Thus, as example, triethanolamine, triisopropanolamine, and methyl diethanolamine may be employed. Likewise, quadrifunctional amines such as $N, -N, N_1, N_1$-tetrakis (2-hydroxy propyl) ethylene diamine manufactured by Wyandotte Chemical Company under the trademark Quadrol may be employed. In this reaction the amine portion acts as a catalyst. Where other hydroxyl bearing agents are employed, they may be in the nature of poly-glycols, trimethylpropane, which gives a rather slow reaction, and castor oil derivatives of varying types. The quadrifunctional amines give the fastest reaction time and the greatest degree of cross linking. In general, as the functionality of the alkanolamine increases, the NCO to OH ratio drops in order to produce satisfactory pot-life and film characteristics.

There are listed below several examples showing the use of polyether prepolymers. In the polyether isocyanate prepolymers, polyether glycols may be employed. Thus, di- and trifunctional glycols can be utilized to form a chain with varying degrees of branching. Basically the polyethers are linear with some branching. The range employed may provide a molecular weight of 900 to 3500 and at the lower molecular weight range of functionality of 2.5 is desirable, while at the higher range a functionality of 2.0 is preferable. It has been found that for best results a glycol having a molecular weight of about 2590 to provide a reaction product with the isocyanate of molecular weight of 2800 and a functionality of 2 is very desirable.

Variants in the polyether formulation illustrating the range that can be employed are listed below. These variants show the range that can be employed in the prime coat.

EXAMPLE 3

*Prime coat*

| Polyol catalyst phase: | Percent by weight |
|---|---|
| Triisopropanolamine | 5.05 |
| Xylol | 94.95 |
| | 100.00 |

| Prepolymer phase: | |
|---|---|
| Isocyanate polyether prepolymer (mol. wt. 2800, functionality 2.0) | 65 |
| Xylol | 35 |
| | 100 |

Polyol catalyst phase is added to prepolymer phase in the volumetric ratio of 1 part of polyol catalyst phase to 4 parts of prepolymer phase. This provides an NCO to OH ratio of 0.9.

EXAMPLE 4

*Prime coat*

| Polyol catalyst phase: | Percent by weight |
|---|---|
| Quadrol | 25.7 |
| Xylol | 74.3 |
| | 100.0 |

| Prepolymer phase: | |
|---|---|
| Isocyanate prepolymer (mol. wt. 2800, functionality 2.0) | 65 |
| Xylol | 35 |
| | 100 |

Polyol catalyst phase is added to the prepolymer phase in the volumetric ratio of 1 to 4. This provides an NCO to OH ratio of 0.6.

To illustrate variants in the formulation of the polyether finish coat, reference is made to Examples 5 and 6 below.

EXAMPLE 5

Finish coat

Polyol catalyst phase: Percent by weight
- Casto oil-polyol (equivalent weight 374, functionality 3.0) _____ 12.5
- Methyl diethanolamine _____ 16.0
- Oil soluble aniline dye _____ 0.1
- Cellosolve acetate (better flow and leveling and slower evaporating solvent) _____ 71.4

100.0

Prepolymer phase:
- Polyether isocyanate prepolymer (functionality of 2.43, MW of reaction product 963, MW of polyether is 550) _____ 71.5
- Xylol solvent _____ 28.5

100.0

In the finish coat the prepolymer phase is added to the polyol catalyst phase in a volumetric ratio of 4 parts of the prepolymer catalyst phase to one part of polyol catalyst phase. This provides a weight ratio of 140 parts of the prepolymer phase to 52 parts of polyol catalyst phase. The NCO ratio to OH is 1.5 to 1.

EXAMPLE 6

Finish coat

Polyol catalyst phase: Percent by weight
- Castor polyol (equiv. wt. 374) _____ 33.8
- Methyl diethanolamine _____ 5.3
- Xylol _____ 22.4
- Methyl Cellosolve acetate _____ 38.5

100.0

Prepolymer phase:
- Isocyanate polyether prepolymer (mol. wt. 965, functionality 2.43) _____ 82.5
- Xylol _____ 17.3
- Oil soluble aniline dye _____ 0.2

100.0

The above formulation is made by adding the polyol catalyst phase to the prepolymer phase in a 1 to 1 volumetric ratio. This provides an NCO to OH ratio when so combined of 1.26.

For the polyester and polyether isocyanate reaction products to provide the coatings listed above, very desirable characteristics have been obtained. As an example, for the prime and finish coat laid down upon a glass plate to provide a 5 mil cast free film, it has been found that a tensile strength of 2,000 to 3,000 p.s.i. can be obtained. This characteristic is also obtained with an elongation of 100% and considerably higher elongations above 200% have been achieved. Likewise, the modulus is very desirable and at 100% is less than 200.

In Example 7 below a prime and finish coat are shown in which the OH content of components other than the polyols is appreciable and is taken into account in calculating the desired NCO to OH ratio.

Prime coat

|  | Wt. | Percent by weight | OH equiv. | NCO equiv. |
|---|---|---|---|---|
| POLYOL CATALYST PHASE |  |  |  |  |
| Barium sulfate | 991.2 | 25.9 |  |  |
| Carbon black | 42.8 | 1.1 |  |  |
| Iron blue | 145.9 | 3.8 |  |  |
| Silicone | 22.7 | .6 |  |  |
| Polyester (polyol, functionality 2.0) (MW 2,000–3,000) | 1,452.9 | 38.0 | 1.1395 |  |
| Methylethyl ketone solvent | 797.5 | 20.8 | 0.2099 |  |
| Toluol solvent | 374.7 | 9.8 |  |  |
| Total | 3,827.7 | 100.0 |  |  |
| PREPOLYMER PHASE |  |  |  |  |
| Methyl isobutyl ketone | 302.8 | 40.3 | 0.0531 |  |
| Prepolymer, functionality 3.0, mol wt. 970 | 449.4 | 59.7 |  | 1.3909 |
| Total | 752.2 | 100.0 | 1.4025 | 1.3909 |
| Grand Total | 4,579.9 |  |  |  |

In this formulation the final finish coat is formulated by mixing 4 parts of polyol catalyst phase to 1 part of the prepolymer phase all by volume. The formulation provides an apparent NCO/OH ratio of 1.22:1 for the isocyanate and polyol in the formulation. However, commercial solvents are employed in this example having a substantial portion of OH bearing impurities and when their OH equivalence is calculated, the total OH in the system was found to have substantially increased. When this effect was considered, the final NCO to OH ratio was found to be 0.992:1.

Finish Coat

|  | Wt. | Percent by weight | OH equiv. | NCO equiv. |
|---|---|---|---|---|
| POLYOL CATALYST PHASE |  |  |  |  |
| Polyester polyol, functionality 2.0 (mol wt. 2,000–3,000) | 1,419.4 | 62.8 | 1.1132 |  |
| Cellulose acetate butyrate | 4.2 | .2 | 0.0049 |  |
| Butyl acetate solvent | 496.4 | 21.9 | 0.1655 |  |
| Methyl isobutyl ketone solvent | 343.1 | 15.1 | 0.0602 |  |
| Total | 2,263.1 | 100.0 |  |  |
| PREPOLYMER PHASE |  |  |  |  |
| Methyl isobutyl ketone | 841.2 | 40.2 | 0.1476 |  |
| Prepolymer, functionality 3.0 (mol wt. 970) | 1,248.5 | 59.8 |  | 3.8641 |
| Total | 2,089.7 | 100.0 | 1.4914 | 3.8641 |
| Grand Total | 4,352.8 |  |  |  |

In this formulation the finish coat is formulated by mixing 4 parts of the polyol catalyst phase to 5 parts of the prepolymer phase all by volume. The final formulation provides an apparent NCO/OH ratio of 3.471:1 for the isocyanate and polyol in the formulation. However, commercial solvents are employed in this example having a substantial portion of OH bearing impurities and when their OH equivalence is calculated, the total OH in the system are found to have substantially increased. When this effect was considered, the final NCO to OH ratio was found to be 2.598:1.

In the foregoing formulations the prepolymer is added to the remainder of the composition of the prime coat shortly before application to the leather. The period of time for use may vary, however, up to 24 hours, but beyond that time setting will take place and longer periods should be avoided. In this application the linear polyester is liquid and the cellulose acetate butyrate is added as a 10% toluene solution, although other solvents also can be employed that are of proper compatibility, to provide flow control. Likewise, as mentioned previously, a silicone can be used to increase the viscosity and to eliminate crawling. To increase penetration, a nonionic oil soluble wetting agent can also be employed. Dyes and pigments can be added. Dyes that are oil soluble are preferred.

The prime coats, above described, after mixing and during the period of life up to 24 hours or so, is then applied to the leather. The application is made to insure a good wet coat and complete covering of the leather.

After 24 hours heat can be applied for pressing and other working operations subch as plating and the like.

After the application of the prime coat, there is a follow-up with the application of the finish coat. If desired, silica gel can be employed in the finish coat to provide a coating of superior abrasion, but somewhat lower gloss. This provides a superior scuff resistance to the coating. As an example, silica gel in the amount of 2 to 12% by weight of the finished coat composition can be employed and a preferable amount would be 6% by weight for men's shoes, for example.

In the mixing of the prepolymer with the remainder of the composition in both the prime coat and the finished coat, it should be noted that thinning may be carried out to any desired degree by the proper application of the solvents previously mentioned, since the amount of the solvent is not critical. The prepolymer is viscous whereas the linear polyol used in the remainder of the composition is very fluid. To effect the mixing of the prepolymer with the remainder of the composition, the two need merely to be added to one another accompanied by physical mixing. This makes it very simple to use the composition in the factory, since up until the time of the application the prepolymer can be kept in one tank and the remainder of the composition can be kept in another tank for long periods of time. It is only after the mixing that the life of the composition is of importance, since, as previously mentioned, this mixed composition should be used within a 24-hour period.

The composition of the coating provided by the multiple coat applications above described furnishes a urethane coating of a very high degree of adhesion to leather. In addition, the coating is characterized by high abrasion resistance and lack of tack coupled with a high degree of gloss. The flexibility of the coating is likewise outstanding. In actual tests the coatings have undergone flex tests in the order of 2,000,000 operations without failure. As an example of comparison, other types of conventional urethane top coats have only withstood 120,000 flexes, while ordinary leather withstood only 18,000. With linseed oil swabbing the leather withstood only 60,000 operations.

The leather coated with this composition can also be conventionally worked upon by the usual factory techniques in preparing shoes and other types of leather. Thus, various plating operations and pressing can be carried out upon the coated leather with complete satisfaction. As an example, a leather coated according to this composition, which was subsequently plated, has withstood 600,000 flexes and showed no sign of failure at the completion of this test.

Accordingly, there has been provided a urethane coating of superior qualities for application to leather. The coating is characterized by extremely high flexibility, a high degree of adhesion to the leather that resists peeling, as well as hardness and any degree of high as well as low gloss. The composition and process of application is one that without any complicated process controls can be conveniently employed in industry with a high degree of success for its intended purpose.

Various changes and modifications, such as substitution of chemical equivalents, may be made within this invention as will be readily apparent to those skilled in the art. Such changes and modifications are within the scope and teaching of this invention as defined by the claims appended hereto.

What is claimed is:

1. A polyurethane coated leather comprising a leather substrate, a polyurethane prime coat and a polyurethane finish coat, said prime coat consisting essentially of the reaction product of a prepolymer of an isocyanate with a polyol having at least one hydroxy group near its terminal portion, said prepolymer having a molecular weight of about 600 to 3500, and said polyol having at least one hydroxy group near its terminal portion and a functionality of 2 to 4 and in which the NCO to OH ratio in the prime coat is about .5–.98:1 and said finish coat consisting essentially of the reaction product of a prepolymer of an isocyanate with a polyol having at least one hydroxy group near its terminal portion, said prepolymer having a molecular weight of about 600 to 3500 and said polyol having at least one hydroxy group near its terminal portion and a functionality of 2 to 4 and wherein the NCO to OH ratio in the finish coat is about 1.1–2.5:1.

2. A polyurethane coated leather comprising a leather substrate, a polyurethane prime coat and a polyurethane finish coat, said prime coat consisting essentially of the reaction product of two components, the first component being a prepolymer of an isocyanate with a polyol having at least one hydroxy group near its terminal portion, said prepolymer having an average molecular weight of about 600 to 3500, and the second component being a separate polyol having at least one hydroxy group near its terminal portion and a functionality of 2 to 4 and in which the ratio of the NCO to OH in the prime coat is about 0.5–.98:1 and said finish coat consisting essentially of the reaction product of two components, the first component being a prepolymer of an isocyanate with a polyol having at least one hydroxy group near its terminal portion, said prepolymer having an average molecular weight of about 600 to 3500 and the second component being a separate polyol having at least one hydroxy group near its terminal portion and a functionality of 2 to 4 and wherein the ratio of the NCO to OH in the finish coat is about 1.1–2.5:1.

3. The polyurethane coated leather of claim 2 in which the second component of the prime coat contains an oil miscible wetting agent.

4. A polyurethane coated leather comprising a leather substrate, a polyurethane prime coat and a polyurethane finish coat, said prime coat consisting essentially of the reaction product of two components, the first component being a prepolymer of an isocyanate with a polyol having at least one hydroxy group near its terminal portion, said prepolymer having an average molecular weight of about 600 to 3500, and the second component being a separate polyol having at least one hydroxy group near its terminal portion and a functionality of 2 to 4 and in which the ratio of the NCO to OH in the prime coat is about 0.5–.98:1 and said finish coat consisting essentially of the reaction product of two components, the first component being a prepolymer of an isocyanate with a polyol having at least one hydroxy group near its terminal portion, said prepolymer having an average molecular weight of about 600 to 3500 and the second component being a separate polyol having at least one hydroxy group near its terminal portion and a functionality of 2 to 4 and wherein the ratio of the NCO to OH in the finish coat is about 1.1–2.5:1, said finish coating containing up to about 10% silica gel to impart lower gloss, added toughness and wear and scuff resistance to the coating.

5. A polyurethane coated leather comprising a leather substrate, a polyurethane prime coat and a polyurethane finish coat, said prime coat consisting essentially of the reaction product of two components, the first component being a prepolymer of an isocyanate with a polyol having at least one hydroxy group near its terminal portion, said prepolymer having an average molecular weight of about 600 to 3500, and the second component being a separate polyol having at least one hydroxy group near its terminal portion and a functionality of 2 to 4 and in which the ratio of the NCO to OH in the prime coat is about 0.5–.98:1 and said finish coat consisting essentially of the reaction product of two components, the first component being a prepolymer of an isocyanate with a polyol having at least one hydroxy group near its terminal portion, said prepolymer having an average molecular weight of about 600 to 3500 and the second component being a separate polyol having at least one hydroxy group near its terminal portion and a functionality of 2 to 4, and said finish coat containing cellulose acetate butyrate and wherein the ratio of the NCO to OH in the finish coat is about 1.1–2.5:1.

6. A polyurethane coated leather comprising a leather substrate, a polyurethane prime coat and a polyurethane finish coat, said prime coat consisting essentially of the reaction product of two components, the first component being a prepolymer of an excess of a stoichiometric amount of isocyanate with a trifuctional polyol, said prepolymer having an average molecular weight of about 600 to 3500, and the second component being a separate polyol having at least one hydroxy group near its terminal portion and a functionality of 2 to 4, and a molecular weight of about 2,000 to 5,000, and in which the ratio of the NCO to OH in the prime coat is about 0.5–.98:1 and said finish coat consisting essentially of the reaction product of two components, the first component being a prepolymer of an excess of a stoichiometric amount of isocyanate with a trifunctional polyol, said prepolymer having an average molecular weight of about 600 to 3500 and the second component being a separate polyol having at least one hydroxy group near its terminal portion and a functionality of 2 to 4 and a molecular weight of about 2,000 to 5,000, and wherein the ratio of the NCO to OH in the finish coat is about 1.1–2.5:1.

7. A polyurethane coated leather comprising a leather substrate, a polyurethane prime coat and a polyurethane finish coat, said prime coat consisting essentially of the reaction product of two components, the first component being a prepolymer of an isocyanate with a polyol having at least one hydroxy group near its terminal portion, said prepolymer having an average molecular weight of about 600 to 3500, and the second component being a separate polyol having at least one hydroxy group near its terminal portion and a functionality of 2 to 4 and in which the ratio of the NCO to OH in the prime coat is about 0.5–.98:1, and an oil miscible wetting agent in said second component, and said finish coat consisting essentially of the reaction product of two components, the first component being a prepolymer of an isocyanate with a polyol having at least one hydroxy group near its terminal portion, said prepolymer having an average molecular weight of about 600 to 3500 and the second component being a separate polyol having at least one hydroxy group near its terminal portion and a functionality of 2 to 4, and wherein the ratio of the NCO to OH in the finish coat is about 1.1–2.5:1, said finish coating further containing cellulose acetate butyrate and up to about 10% silica gel to impart lower gloss, added toughness and wear and scuff resistance to the coating.

8. A polyurethane coated leather comprising a leather substrate, a polyurethane prime coat and a polyurethane finish coat, said prime coat consisting essentially of the reaction product of two components, the first component being a prepolymer of an excess of a stoichiometric amount of isocyanate with a trifunctional polyol and containing an oil miscible wetting agent, said prepolymer having an average molecular weight of about 600 to 3500, and the second component being a separate polyol having at least one hydroxy group near its terminal portion and a functionality of 2 to 4, and a molecular weight of about 2,000 to 5,000, and in which the ratio of the NCO to OH in the prime coat is about 0.5–.98:1 and said finish coat consisting essentially of the reaction product of two components, the first component being a prepolymer of an excess of a stoichiometric amount of isocyanate with a trifunctional polyol, said prepolymer having an average molecular weight of about 600 to 3500 and the second component being a separate polyol having at least one hydroxy group near its terminal portion and a functionality of 2 to 4 and a molecular weight of about 2,000 to 5,000, and wherein the ratio of the NCO to OH in the finish coat is about 1.1–2.5:1, said finish coat further containing cellulose acetate butyrate and up to about 10% silica gel to impart lower gloss, added toughness and wear and scuff resistance to the coating.

9. A method of applying a plurality polyurethane coating to leather comprising a polyurethane prime and a polyurethane finish coating which comprises preparing a prime coating consisting essentially of the reaction product of a prepolymer of an isocyanate with a polyol having at least one hydroxy group near its terminal portion, said prepolymer having a molecular weight of about 600 to 3500 and said polyol having at least one hydroxy group near its terminal portion and a functionality of 2 to 4 and in which the NCO to OH ratio in the prime coat is about .5–.98:1 and said finish coat consisting essentially of the reaction product of a prepolymer of an isocyanate with a polyol having at least one hydroxy group near its terminal portion, said prepolymer having a molecular weight of about 600 to 3500 and said polyol having at least one hydroxy group near its terminal portion and a functionality of 2 to 4 wherein the NCO to OH ratio in the finish coat is about 1.1–2.5:1, applying to said leather said prime coat, drying said prime coat and applying at least one finish coat and drying the same.

10. A method of applying a plural polyurethane coating to leather comprising a polyurethane prime and a polyurethane finish coating which comprises preparing a prime coating consisting essentially of the reaction product of two components, the first component being a prepolymer of an isocyanate with a polyol having at least one hydroxy group near its terminal portion, said prepolymer having an average molecular weight of about 600 to 3500, and the second component being a separate polyol having at least one hydroxy group near its terminal portion and a functionality of 2 to 4 and in which the ratio of the NCO to OH in the prime coat is about 0.5–.98:1 and said finish coat consisting essentially of the reaction product of two components, the first component being a prepolymer of an isocyanate with a polyol having at least one hydroxy group near its terminal portion, said prepolymer having an average molecular weight of about 600 to 3500 and the second component being a separate polyol having at least one hydroxy group near its terminal portion and a functionality of 2 to 4 and wherein the ratio of the NCO to OH in the finish coat is about 1.1–2.5:1, applying to said leather said prime coat, drying said prime coat and applying at least one finish coat and drying the same.

11. A polyurethane coated substrate comprising a substrate of leather and the like, wherein said substrate contains material reactive with isocyanate, a polyurethane prime coat and a polyurethane finish coat, said prime coat consisting essentially of the reaction product of an isocyanate with a polyol having at least one hydroxy group near its terminal portion and a functionality of 2 to 4 and in which the NCO to OH ratio in the prime coat is about 0.5 to 0.98:1 and said finish coat consisting essentially of the reaction product of an isocyanate with a polyol having at least one hydroxy group near its terminal portion and a functionality of 2 to 4 and in which the NCO to OH ratio in the finish coat is in excess of 1:1.

12. The polyurethane coated substrate of claim 11 in which the NCO to OH ratio in the finish coat is about 1.1–3.7:1.

13. The polyurethane coated substrate of claim 11 in which the NCO and OH ratio in the finish coat is about 1.1–2.5:1.

14. A method of applying a plural polyurethane coating to a substrate of leather and the like, wherein said substrate contains material reactive with isocyanate, said coating comprising a polyurethane prime and a polyurethane finish coating which comprises preparing a prime coating consisting essentially of the reaction product, an isocyanate with a polyol having at least one hydroxy group near its terminal portion, and a functionality of 2 to 4 and in which the NCO to OH ratio in the prime coat is about .5–.98:1 and said finish coat consisting essentially of the reaction product of an isocyanate with a polyol having at least one hydroxy group near its terminal portion and a functionality of 2 to 4 wherein the NCO to OH ratio in the finish coat is in excess of 1:1, applying to said leather said prime coat, drying said prime coat and applying at least one finish coat and drying the same.

15. The process of claim 14 in which the NCO to OH ratio in the finish coat is about 1.1–3.7:1.

16. The process of claim 14 in which the NCO to OH ratio is about 1.1–2.5:1.

17. A polyurethane coated substrate comprising a substrate of leather and the like, wherein said substrate contains material reactive with isocyanate, a polyurethane prime coat and a polyurethane finish coat, said prime coat consisting essentially of the reaction product of an isocyanate with a polyol having at least one hydroxy group near its terminal portion and a functionality of 2 to 4 and in which the NCO to OH ratio in the prime coat is less than 1, and said finish coat consisting essentially of the reaction product of an isocyanate with a polyol having at least one hydroxy group near its terminal portion and a functionality of 2 to 4 and in which the NCO to OH ratio in the finish coat is in excess of 1:1.

References Cited by the Examiner

UNITED STATES PATENTS

| 2,884,340 | 4/1959 | Loshaek | 117—76 |
| 2,973,284 | 2/1961 | Semegem | 117—76 |
| 3,119,716 | 1/1964 | Wooster | 117—142 |

FOREIGN PATENTS

| 585,378 | 10/1959 | Canada. |
| 815,185 | 6/1959 | Great Britain. |

OTHER REFERENCES

Dombrow: "Polyurethanes," Reinhold Pub. Co., 1957.

WILLIAM D. MARTIN, *Primary Examiner.*

MURRAY KATZ, *Examiner.*